Oct. 19, 1965    W. BEYER    3,212,837
MOTION PICTURE PROJECTOR
Filed March 2, 1960
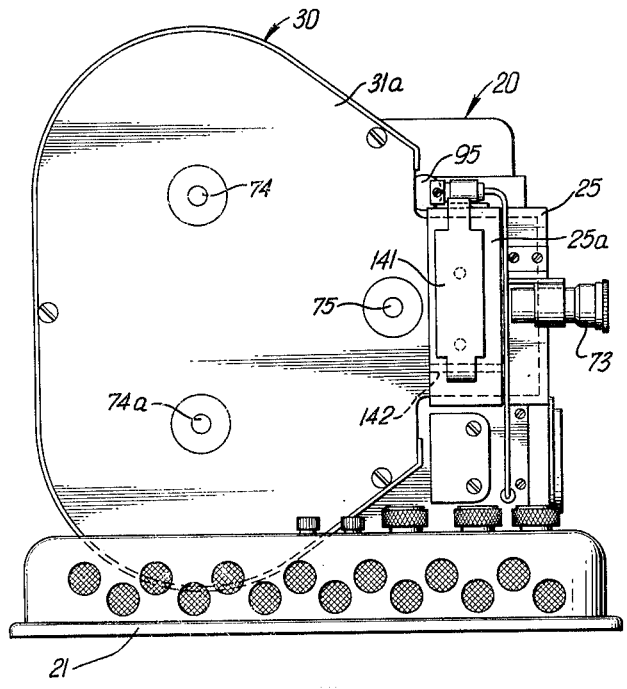
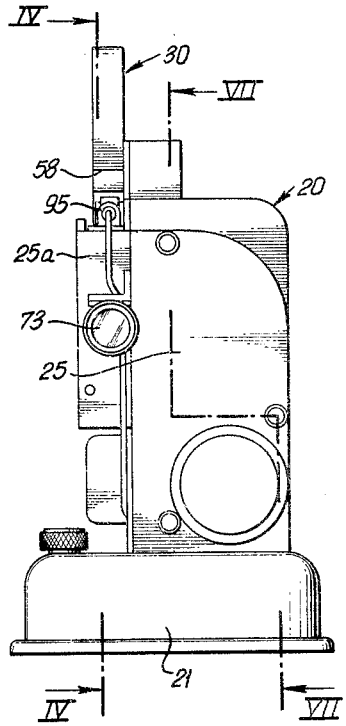
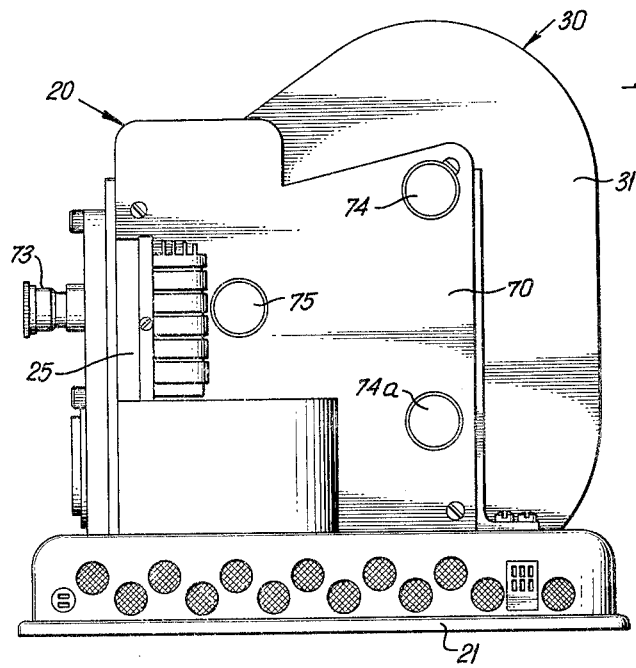
INVENTOR.
WALTER BEYER
BY
Miketta and Glenny
ATTORNEYS.

Oct. 19, 1965 W. BEYER 3,212,837
MOTION PICTURE PROJECTOR
Filed March 2, 1960 5 Sheets-Sheet 2
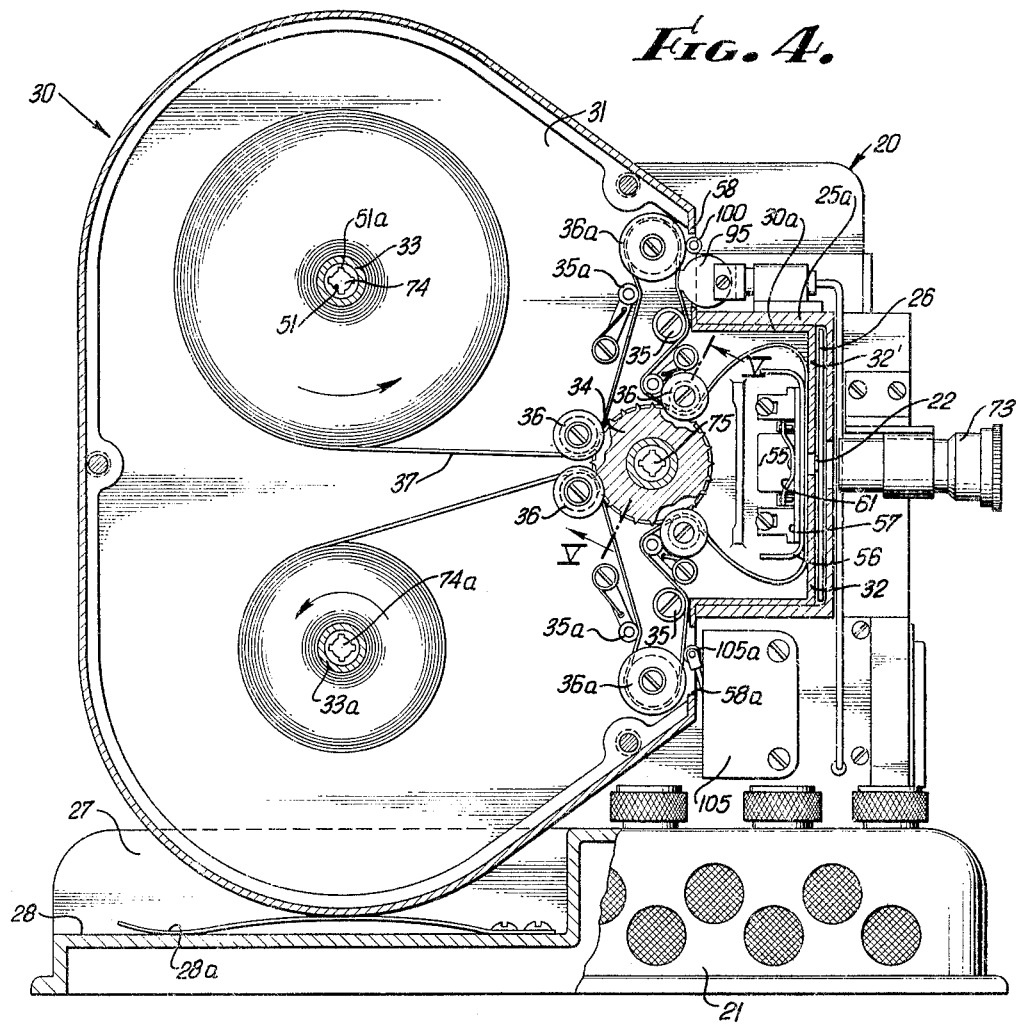
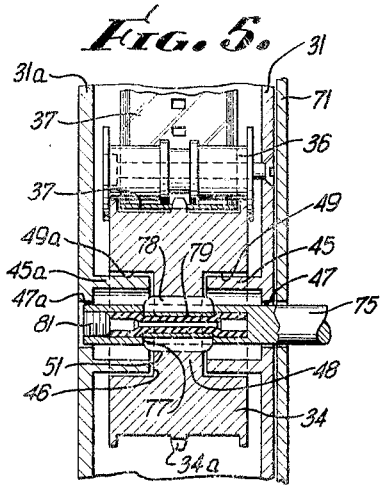
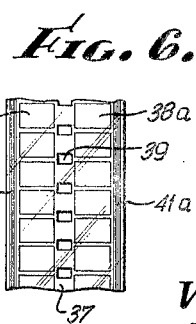
INVENTOR.
WALTER BEYER
BY
Miketta and Glenny
ATTORNEYS.

Oct. 19, 1965     W. BEYER     3,212,837
MOTION PICTURE PROJECTOR
Filed March 2, 1960     5 Sheets-Sheet 3

INVENTOR.
WALTER BEYER
BY
Miketta and Glenny
ATTORNEYS.

Oct. 19, 1965 W. BEYER 3,212,837
MOTION PICTURE PROJECTOR
Filed March 2, 1960 5 Sheets-Sheet 4
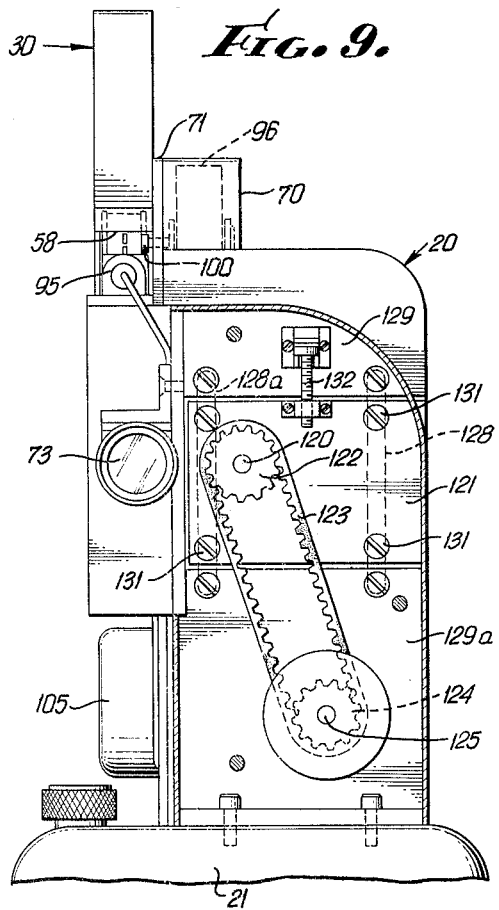
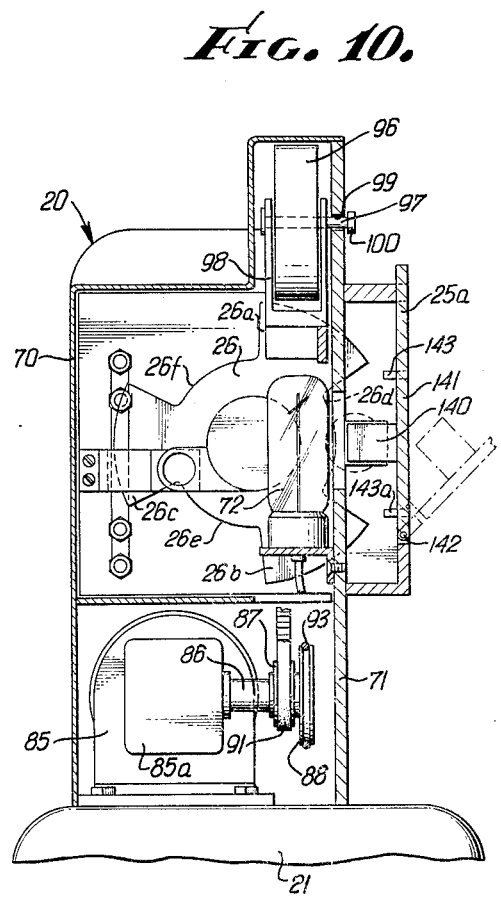
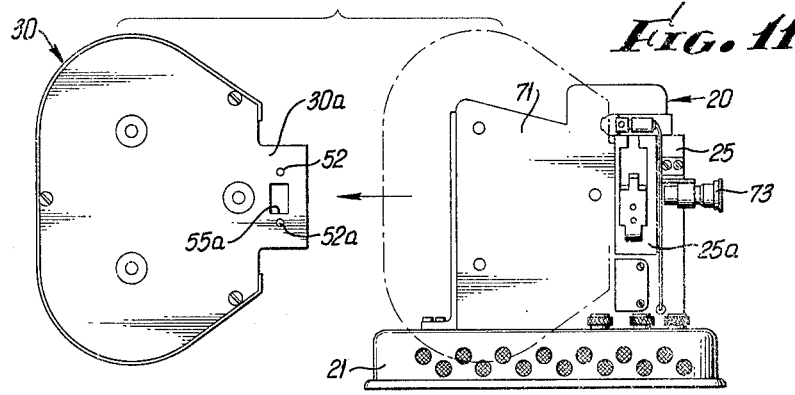
INVENTOR.
WALTER BEYER
BY Miketta and Glenny
ATTORNEYS.

Oct. 19, 1965 W. BEYER 3,212,837
MOTION PICTURE PROJECTOR
Filed March 2, 1960 5 Sheets-Sheet 5
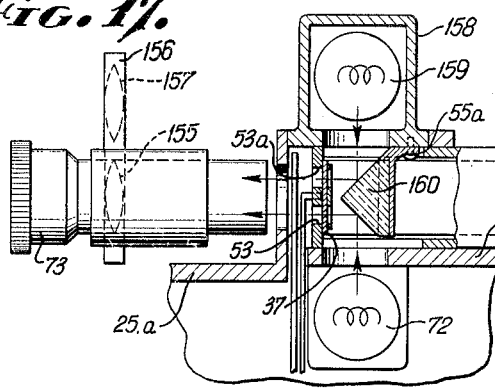
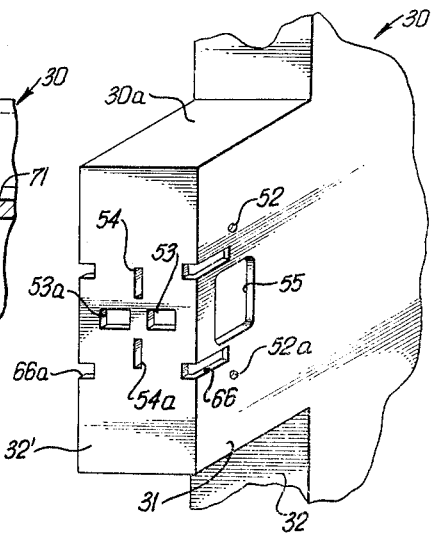
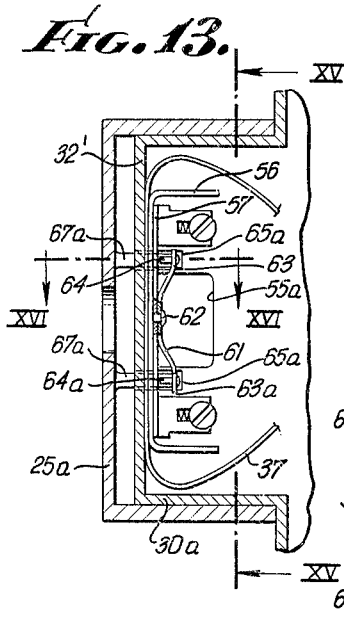
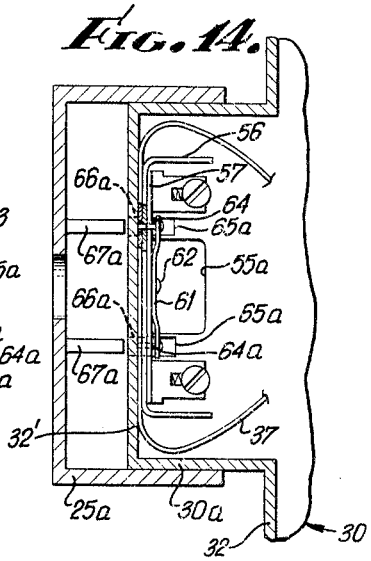
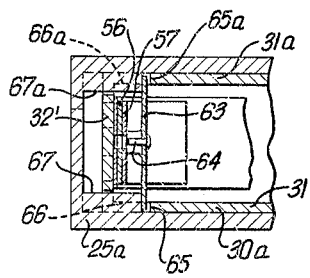
INVENTOR.
WALTER BEYER
BY Miketta and Glenny
ATTORNEYS.

3,212,837
MOTION PICTURE PROJECTOR

Walter Beyer, Los Angeles, Calif., assignor, by mesne assignments, to Cordova, Inc., Beverly Hills, Calif., a corporation of California
Filed Mar. 2, 1960, Ser. No. 12,438
5 Claims. (Cl. 352—72)

The present invention relates to an extremely simple and inexpensive motion picture projector requiring no film threading and having a removable film magazine enclosing and carrying a complete reel of film to be shown in the projector. This type of projector may be operated by unskilled operators in the home, office or school as easily as by trained personnel.

The main difficulty in operating a motion picture projector is the threading of the film, this operation being time-consuming, subject to registration difficulties and generally requiring a trained operator. The present invention completely eliminates these problems by providing a projector with a removable and sealed magazine containing film spools, a drive sprocket, film rollers and drums and a gate through which the film is initially threaded at the film laboratory and need not be handled thereafter during any number of subsequent projections. By merely mounting the magazine on the projector and interconnecting the film drive mechanism on the projector with the film drive sprocket and spools, an untrained operator may easily operate the projector with little or no instructions. This completely eliminates threading and handling of the film itself and thereby greatly lengthens the life of the film. A library of film magazines, each magazine containing film of a different subject matter, may be maintained and used in supplying individual magazines to educational institutions, homes, language schools and governmental groups such as the Armed Forces, each of which would be provided with a projector of the present invention. Since each magazine is virtually sealed, shipment of the magazine with its contained film is facilitated. The magazine may be rented or leased or sold.

In order to provide a single magazine with a full length picture film, it is preferred that the film be of the type disclosed in copending application Serial No. 828,401, filed on July 20, 1959, now Patent No. 3,115,806, wherein the film has two rows of images separated by a central row of sprocket holes and a sound track along each longitudinal edge of the film. The images of one row may be facing in the same or opposite direction as the images of the other row.

The motion picture projector and reversible, sealed magazine of the present invention are provided with numerous cooperating elements which insure fool-proof operation. The light source, shutter, drive mechanisms and sound reproducing units are contained within the projector. Means are provided for insuring proper positioning of the magazine with respect to the projection lens carried by the projector, and for guiding the light from the projector into the magazine. Means are provided for always maintaining the picture areas of the film in the magazine in registration with the film aperture, so that adjustments are unnecessary. Means are also provided for automatically engaging an intermittent movement (embodied in the projector) with the film in the magazine only when such magazine has been received by guiding and positioning means on the projector. Although the film moves intermittently through the film gate, provision is made for constant speed movement of adjacent portions of film which automatically come into cooperative relation with sound pick-up devices carried by the projector when the magazine is in position. Simple, unmistakable guiding and connecting surfaces are provided on the projector for the reception and attachment of the magazine. Automatic disconnect means preclude the possibility of removing all film from a feed spool; since the magazine is symmetrical and the film carries two parallel rows of picture areas or images, the magazine may be reversed and is ready for projection without rewinding.

As will be easily recognized by those skilled in the art, the present motion picture projector is eminently capable of showing a single row of images, superimposed images from two rows of images to simulate 3–D, or double images in side-by-side relation. In addition, synchronized sound may also be provided for each type of image projection and stereosound may be reproduced by simultaneously using the two sound tracks carried on the film. The preesnt motion picture projector therefore has many uses and is extremely flexible in its operation.

An object of the present invention is to provide a motion picture projector requiring no threading, handling or rewinding of film and being operable by unskilled operators.

Another object is to provide a motion picture projector having a removable film magazine, which is capable of showing a single, standard row of images, superimposed images from two rows of images to simulate 3–D, or double images in side-by-side relation, and which may reproduce mono- or stereosound from the sound tracks on the film.

Another object is to provide a motion picture projector which is inexpensive to produce, simple to operate, relatively lightweight, and capable of projecting a full length feature film in one operation without film threading.

A further object is to provide a compact, symmetrical, reversible, portable film magazine adapted to be assembled on and removed from a motion picture projector.

Still another object is to provide a portable film magazine having means for preventing a roll of film within the magazine from being unreeled when the magazine is disassembled from a motion picture projector.

Another object is to provide a portable film magazine with means for maintaining the film within the magazine in registration with the projection apertures and film pull-down claw slot when the magazine is disassembled from the projector.

An object is to provide a motion picture projector having a removable film magazine containing a reel of film having a sound track, whereby means is carried on the projector for providing uniform film movement over a sound pick-up head.

Other objects and advantages of this invention will be readily apparent from the following description, when considered in connection with the appended drawings.

In the drawings:

FIG. 1 is a side elevation of an exemplary device of the present invention.

FIG. 2 is a front end elevation of the device of FIG. 1.

FIG. 3 is a side elevation of the other side of the device of FIG. 1.

FIG. 4 is a longitudinal section of the device taken along plane IV—IV of FIG. 2.

FIG. 5 is a transverse section of the device taken along plane V—V of FIG. 4 and shows a typical rotatable mounting structure for each of the film spools and film drive sprocket carried in the magazine.

FIG. 6 is a front elevation of a fragmentary portion of film adapted to be and preferably carried by the film magazine of the projector of the present invention.

FIG. 9 is a transverse section of the device taken along plane IX—IX of FIG. 7.

FIG. 10 is a transverse section of the device taken along plane X—X of FIG. 7 with the film magazine disassembled from the projector.

FIG. 11 is a side elevation of the device with the film magazine disassembled from the projector and indicating the assembled position of the magazine in phantom outline.

FIG. 12 is a front perspective of the forwardly extending portion of the film magazine.

FIG. 13 is a longitudinal section through the forwardly extending magazine portion properly positioned in the shutter housing, the shutter and claw member being omitted for clarity.

FIG. 14 is a longitudinal section similar to FIG. 13 but the forwardly extending portion of the magazine is not in its forwardmost and properly assembled position.

FIG. 15 is a transverse section of the device taken along plane XV—XV of FIG. 13.

FIG. 16 is a transverse section of the device taken along plane XVI—XVI of FIG. 13.

FIG. 17 is another embodiment of the device of the present invention, primarily used for 3–D projection.

Figure 7:
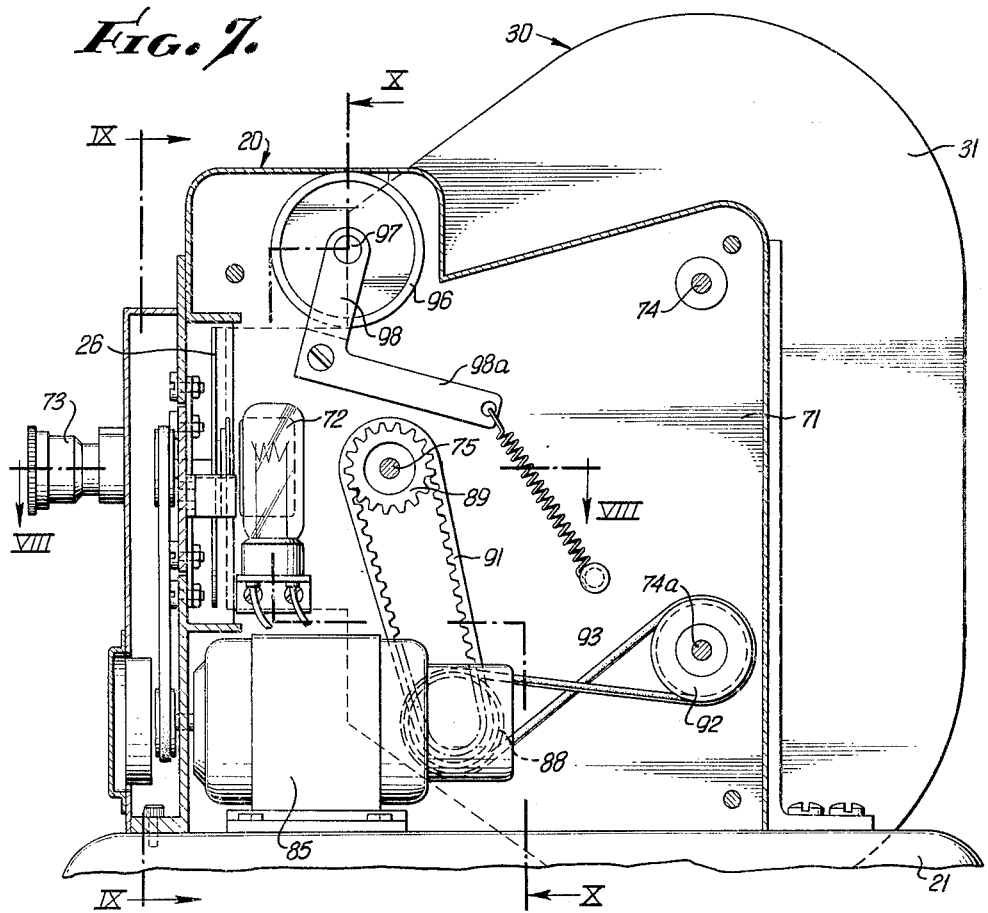
FIG. 7 is a longitudinal section of the device taken along plane VII—VII of the device of FIG. 2.

In accordance with the present invention, an exemplary device is shown in the drawings and includes a motion picture projector 20 having a removable and reversible film magazine 30. The film magazine 30 rotatably carries film spools, film rollers, film drums and a film drive sprocket through which a film is properly threaded at the film laboratory or plant from which the magazines are shipped, sold or leased. The magazine 30 is easily connected to and removed from the projector 20, by a simple sliding movement of the magazine as shown in FIG. 11, without the need of threaded connections, optical alignment, picture area registration, film threading or rewinding.

The projector 20 may be provided with a hollow base 21 for carrying and enclosing sound amplifying and reproducing units, a power supply, on-and-off relays, electrical wiring and other components needed for providing an operable motion picture projector capable of reproducing sound. The wiring and electrical equipment in the base 21 are of well known design and need not be specifically described as they form no part of the present invention.

The forward portion of the base 21 is provided with a transverse shutter housing 25 adapted to enclose a shutter 26 and an intermittent movement, film-engaging claw member 22. The base 21 and shutter housing 25 cooperate to form a longitudinal film magazine guideway 27, the rear portion of which comprises a slot 28 in the base 21 and the front portion being formed by an extension 25a of the housing 25. When assembled in the guideway 27, the rear portion of the magazine 30 is received in slot 28 and the forward portion 30a of the magazine 30 is guidingly received and releasably held in the extension 25a of housing 25. A leaf spring 28a may be provided in slot 28 for biasing the forward magazine portion 30a into registration with the housing extension 25a.

A drive and light housing 70 may be carried on the base 21 and includes a vertical, magazine-mounting side wall 71 which cooperates with the guideway 27 in properly aligning the magazine 30 within the shutter housing 25. A suitable light source 72 and lens 73 may be carried by and associated with the housing 70, the lens 73 being in longitudinal alignment with the magazine guideway 27 and adapted to be in optical alignment with projection apertures on the removable magazine 30 when assembled on the projector 20.

*Film magazine*

The removable and portable magazine 30 includes side members 31 and 31a and a front wall 32. Either of the the side members 31 and 31a is provided with an edge flange which is detachably but tightly secured to the other in a semi-permanent manner by any suitable means to form a tight, sealed magazine 30 capable of protecting the contained film during shipment or handling of the magazine. The side members 31 and 31a enclose and rotatably carry a pair of spaced film spools 33 and 33a, a film drive sprocket 34, film rollers 35 and film drums 36. An exemplary type film 37 adapted to be carried by and threaded in the magazine is shown in FIG. 6 and is adapted to have each end frictionally attached to one of the spools 33 and 33a. The spools 33 and 33a are alternately employed as feed and take-up film spools. The film 37 is pre-threaded around and between the rollers 35, drums 36 and sprocket 34 in a well known manner as shown best in FIG. 4. In order to have a tight loop for the threaded film 37 for better sound reproduction and pickup, certain rollers 35a are adapted to be spring-biased.

The film 37 may have two rows of images 38 and 38a, separated by a central row of sprocket holes 39. A magnetic sound track 41 and 41a is provided on each longitudinal edge of the film 37 and is preferably suitably longitudinally displaced and synchronized with the adjacent row of images. If the images in row 38 face in the opposite direction than the other images of row 38a, it is understood that each row of images constitutes substantially one-half of a full length picture. Therefore, the magazine 30 need only be reversed through 180° in order to show both rows of images and the complete picture. However, the images of each row may face in the same direction and be simultaneously shown either in side-by-side relationship or superimposed on each other to simulate 3–D. Accordingly, the sound tracks 41 and 41a may be used separately or simultaneously if stereosound is desired.

With film of the type described, the film drive sprocket 34 is provided with a central row of circumferential sprocket teeth 34a for engaging the sprocket holes 39 in the film 37.

Since the drive means for the film sprocket 34 and film spools 33 and 33a are carried on the projector 20, it is considered unnecessary to provide an extra set of expensive bearings for properly mounting the sprocket 34 and spools 33 and 33a within the magazine. This considerably reduces the cost of the projector and is an important factor in being able to make available an economical projector for institutions, schools and amateur operators. Therefore, retaining means are provided on the inside of the side members 31 and 31a for rotatably carrying the spools 33 and 33a and the drive sprocket 34 in a relatively loose manner. When the magazine 30 is disassembled from the projector 20, the spools 33 and 33a and sprocket 34 frictionally engage the side members 31 and 31a and prevent the film 37 from being unreeled from the spools 33 and 33a. Such a retaining means may be identical for each of the spools 33 and 33a and the drive sprocket 34 and a preferred construction is shown in FIG. 5.

The retaining means for rotatably mounting each of the spools 33 and 33a and sprocket 34 may comprise a first hollow, cylindrical trunnion member 45 formed on the inner surface of side member 31 and a second hollow trunnion member 45a carried on the inner surface of side member 31a, the trunnions 45 and 45a extending inwardly, being in alignment with and terminating short of each other to provide a space 46 therebetween. The side members 31 and 31a have a pair of transversely aligned shaft-receiving openings 47 and 47a, respectively, centrally located within the hollow trunnion members 45 and 45a. The sprocket 34 (and each spool 33 and 33a)

has a central bearing portion 48 located in and being of less thickness than the space 46 between trunnions 45 and 45a. The sides of sprocket 34 (and each spool 33 and 33a) are provided with outwardly facing recesses 49 and 49a that are separated by a bearing portion 48 and the loosely and somewhat tiltably received trunnions 45 and 45a, respectively, as each recess 49 and 49a has a greater diameter than the outer diameter of the trunnions 45 and 45a. Each bearing portion 48 has a transverse central shaft-receiving opening 51 therethrough of a diameter less than the inner diameter of the trunnions 45 and 45a and is adapted to be frictionally engaged by a driving and journaling shaft carried on the projector when the magazine 30 is assembled on the projector 20. Any number of transverse locking-lug receiving slots 51a may be provided in the wall of openings 51 to allow a better frictional engagement with the driving shaft.

It will be noted that the front wall 32 of the magazine is provided with a centrally placed forwardly extending front wall portion 32' which forms a film projection chamber 30a containing a film gate. The entire magazine is symmetrical, the axes of spools 33 and 33a being equally spaced above and below a horizontal plane passing through the axis of drive sprocket 34, such plane bisecting the forward extension of the magazine and being coincidental with the optical axis of the lens of the projector (when the magazine is mounted upon the projector). Within the magazine portion 30a and rearwardly of the front wall 32', a standard type of film gate 56 is provided including a spring-biased pressure plate 57. The film 37 is threaded between the film gate 56 and front wall 32' with loops on either side thereof in the standard and well known manner for allowing intermittent movement of the film at the projection apertures 53 and 53a. The front wall portion 32' includes a pair of laterally adjacent projection apertures 53 and 53a (FIG. 12) for registering with the two rows of film images 38 and 38a and for being in optical alignment with the lens 73. In order to impart intermittent movement to the film in the projection chamber 30a centrally located claw-receiving slots 54 and 54a are provided in the front wall 32' above and below apertures 53 and 53a for receiving the film pull-down claw member 22, the slots 54 and 54a being in alignment with the central row of sprocket holes 39 when the magazine 30 is loaded with film 37.

Sound pickup apertures 58 and 58a (FIG. 4) are provided in the front wall 32 above and below the forwardly extending magazine portion 30a. A film guide roller or drum 36a is rotatably mounted directly behind the apertures 58 and 58a and is adapted to be engaged by flywheel means carried on the projector as described in detail hereinafter. Opposed and transversely aligned openings 55 and 55a are provided in side members 31 and 31a, respectively, within the forwardly extending magazine portion 30a and rearwardly of the front wall 32 for receiving reflecting means and light rays from the light source 72 within the projector 20. Register pin openings 52 and 52a are provided in each of the side members 31 and 31a above and below the opposed openings 55 and 55a for receiving registration pins on the shutter housing for aiding in properly aligning the forwardly extending magazine portion 30a in the shutter housing extension 25a.

When the magazine 30 is removed from the projector 20, it is important to maintain the images of rows 38 and 38a and the sprocket holes 39 of the film 37 in registration with the projection apertures 53 and 53a and slots 54 and 54a, respectively. Therefore, means 61 is associated with the film gate 56 including spring-biased, film sprocket holes, engaging pins for holding the film 37 in registration and for being automatically disengaged from the film 37 when the forwardly extending magazine portion 30a is positioned in the shutter housing extension 25a. Such means may include an I-shaped resilient member 61 (FIGS. 13 to 16) secured at the center of its narrow vertical member by a screw 62 to the pressure plate 57. The member 61 has an upper transverse arm 63 carrying a central, forwardly extending film sprocket hole-engaging pin 64 and a lower transverse arm 63a carrying a central, forwardly extending film sprocket hole-engaging pin 64a. The pins 64 and 64a are adapted to extend through central slots in the pressure plate 57 and film gate 56 for engaging sprocket holes 39 in the film 37 and hold the film in registration with projection apertures 53 and 53a and slots 54 and 54a in the front wall 32' of the magazine when removed from the shutter housing.

In order for the registering pins 64 and 64a to automatically disengage the film 37 when the magazine 30 is assembled in shutter housing 25, the ends of the spring arms 63 and 63a extend through slots 65 and 65a in the side members 31 and 31a, respectively. Axially extending grooves 66 and 66a are provided on the outside of the side members 31 and 31a, respectively, from the front wall 32' to the end of the slots 65 and 65a, such grooves 66 and 66a on each side member being vertically spaced apart the same distance as arms 63 and 63a so that the ends of arms 63 and 63a extend through slots 65 and 65a and into the grooves 66 and 66a. Axially extending disengaging bars 67 and 67a are provided within the shutter housing extension 25a for extending into grooves 66 and 66a and engaging the ends of the resilient arms 63 and 63a. When the forwardly extending magazine portion 30a is properly positioned in housing extension 25a, the bars 67 and 67a have forced the resilient arms 63 and 63a into the bowed position shown in FIGS. 13 and 16 and have disengaged the pins 64 and 64a from the sprocket holes 39 of the film 37. The rear ends of grooves 66 and 66a constitute stops for limiting the forward movement of the magazine 30 and provides a space between the front wall 32 and housing 25a for receiving the shutter 26 and claw member 22. Upon removing the magazine 30 (FIG. 14), the pins 64 and 64a are allowed to move forwardly again and engage the film sprocket holes 39 as the intermittent movement claw member 22 is timed and controlled to constantly position the film sprocket holes 39 in alignment with the film registration pins 64 and 64a when the projector is stopped. The cooperation of the disengaging bars 67 and 67a and grooves 66 and 66a also ensure proper registration and alignment of the forwardly extending magazine portion 30a within the housing extension 25a.

As shown in the drawings, the film spools, rollers, sprocket, apertures and slots are positioned and arranged on and in the magazine 30 in such a manner that the magazine 30 is symmetrical about a transverse plane through the axis of the drive sprocket 34 and the projection apertures 53 and 53a. This allows the magazine 30 to be reversible on the projector 20 so as to separately show each row of images 38 and 38a on the film 37. After the film has been reversed and the second row of images has been shown, the reel of film is in its original position. This eliminates threading and rewinding.

When the magazine 30 is removed from the projector 20 for shipment, a protective cover is adapted to be placed over the sound pickup apertures 58 and 58a, slots 54 and 54a, and projection apertures 53 and 53a in the front wall 32 to prevent damage to the film 37 during shipment.

*Drive and shutter housing*

The vertical magazine mounting side wall 71 of the drive housing 70 carries spaced axially movable drive shafts 74, 74a and 75, each selectively movable to extend from the wall 71 into the guideway 27 and drivingly engage the film spools 33, 33a and drive sprocket 34, respectively, when the magazine 30 is carried in the guideway 27. The shafts 74, 74a and 75 are preferably identical and are mounted on the wall 71 by similar bearing means. Therefor, a detailed description of the drive shaft 75 for the drive sprocket 34 is only needed to understand structure and operation of all of the shafts.

The shaft 75 is transversely carried by and axially movable in a bearing 76 (FIG. 8) mounted on the wall 71. The bearings may be made of self-lubricating materials for bushings such as Teflon (trademark) that require no maintenance. The inner end of shaft 75 is provided with knurled knob and the outer end is hollow (FIG. 5) and preferably has an outer diameter slightly less than the diameters of openings 47 and 47a in side members 31 and 31a, and opening 51 in bearing portion 48 of sprocket 34. However, the shaft 75 could be of the same diameter as bearing portion opening 51 in sprocket 34 for tight frictional driving engagement without mechanical slippage or delay. Transverse openings 77 may be provided in shaft 75 for receiving transversely extending locking lugs 78 adapted to engage lug-receiving slots 51a in the wall of bearing portion opening 51. A resilient member 79 may be positioned in the hollow of shaft 75 for resiliently biasing the lugs 78 outwardly through openings 77 and for allowing inward movement of the lugs 78 when engaging the sprocket bearing portion 48. A threaded plug 81 may be threadedly received in the end of the shaft hollow for holding the resilient member 79 in place and for varying the transverse outward pressure on lugs 78.

It is preferred that only the drive sprocket 34 and the film spool 33a which is used as the takeup spool in the magazine position shown in the drawings, be motor-driven. A synchronous drive motor 85 and gear reduction box 85a are carried and suitably anchored on the base 21 and are adapted to drive the sprocket shaft 75 and film takeup spool shaft 74a by means of a gear reduction shaft 86 carrying a sprocket 87 and a pully 88. The inner end of sprocket shaft 75 carries a sprocket 89 and a sprocket chain 91 is entrained around sprockets 87 and 89 and is adapted to rotate shaft 75 and film drive sprocket 34. The inner end of shaft 74a carries a pully 92 and a resilient belt 93 is entrained over pulleys 88 and 92 and is adapted to drive spool shaft 74a and film takeup spool 33a. It is understood that when the magazine is reversed, the spool 33 will become the film takeup spool and will be driven by shaft 74a.

A sound pickup head 95 of well known design and construction is carried on the projector 20 and when the magazine 30 is assembled on the projector 20, the sound pickup head extends into a sound pickup aperture 58 in the front wall 32 of the magazine and engages a magnetic sound track 41 or 41a on the film 37. Suitable wiring connects the head 95 with the sound reproducing units within the base 21. It is understood that two sound pickup heads may be utilized in the event stereo-sound is desired.

It is well known that film provided with sprocket holes tends to flutter and vibrate when passing over a sound pickup head even when threated between film rollers and drums in a tight loop. This produces extremely bad sound reproduction at the sound pickup head. The best results are obtained when the film and magnetic sound track are uniformly moved over and engage the sound pickup head. This is accomplished in the present invention by providing on the projector 20, a flywheel 96 of a given mass carried on and keyed to a transverse shaft 97 mounted on a yoke 98 which is pivotally secured to housing 70 by a spring-biased bracket 98a (FIG. 7).

The flywheel shaft 97 extends through an opening 99 (FIG. 10) in the wall 71 and carries a small film drum-engaging wheel 100 which is located adjacent the sound pickup head 95. When the magazine is assembled on the projector 20, the wheel 100 exetnds into the magazine through aperture 58 and engages the film drum 36a (FIG. 4) which is located immediately adjacent and before the location where the sound pickup head 95 engages the film sound track 41 or 41a. As the film 37 is drawn around film drum 36a by drive sprocket 34, the film drum 36a is rotated. Due to the engagement of film drum 36a and wheel 100, the flywheel 76 is also rotated when the film drum 36a is rotated. The inertia of the heavy flywheel 96 opposes and moderates any fluctuation of speed of the film drum 36a and therefore causes the film 37 to have uniform and non-fluctutaing movement and speed over the sound pickup head 95. It is understood that when the magazine 30 is reversed the film drum-engaging wheel 100 and sound pickup head 95 extend through the aperture 58a and perform their intended functions.

A motor cut-off micro-switch 105 is carried on the projector 20 and has a roller head 105a adapted to extend through aperture 58a and engage the edge of the film 37. The ends of the film 37 are adapted to have a cut-out portion immediately following the last image of each row of images 38 and 38a. When the cut-out portion on the ends of the film 37 passes under the roller head 105a, the roller head 105a will move inwardly and actuate the micro-switch 105 and stop the motor 85 of the projector 20. The electrical wiring diagram is considered well known and not included herein for clarity and brevity.

*Shutter housing*

Within the shutter housing 25, the shutter 26 is rotatably mounted on one end of a shaft 120 (FIGS. 8 and 9) carried in a transverse vertical partition wall 121. The other end of shaft 120 carries a sprocket 122 adapted to receive a sprocket chain 123 entrained over gear 124 keyed to a motor shaft 125 driven by the motor 85. As shown in FIG. 9, the vertical partition wall 131 is movably carried in a vertical direction by means of a pair of vertical brackets 128 and 128a secured at their ends to upper and lower housing plates 129 and 129a. Slots are provided in brackets 128 and 128a for receiving suitable guide bolts 131 carried by and extending through the partition wall 121. Any suitable means such as the adjusting screw 132 may be provided for easily adjusting the vertical position of the partition wall 121, the shutter shaft 120, and the shutter 26.

The shutter 26 is provided with spaced radial projection aperture blocking portions 26a, 26b, and 26c (FIG. 10) which are of a sufficient radius to extend into the shutter housing extension 25a and block and prevent any light from passing through the magazine projection apertures 53 and 53a to lens 73. The shutter blocking portions 26a, 26b and 26c are equally spaced 120° apart and the shutter portions 26d, 26e and 26f therebetween are of a smaller radius so that light may pass through both magazine projection apertures 53 and 53a to a lens 73. However, in order to show only a single row of images through one projection aperture 53, a removable light-blocking shield 135 (FIG. 8) is adapted to be slidingly carried in an opening 136 in the housing extension 25a and to extend over magazine projection aperture 53a. It is understood that when both rows of film images 38 and 38a are desired to be simultaneously shown, the shield 135 is removed.

Light-reflecting means is provided for directing light rays from the light source 72 in the light housing 70 into the forward extension 30a of the magazine 30 and through at least one projection aperture 53 or 53a. It is preferred that a reflecting means 140 be pivotally mounted, by means of a door 141, on the housing extension 25a. The door 141 is pivotally mounted by a pin 142 and has inwardly extending registration pins 143 and 143a (FIG. 10) for registering with and entering openings 52 and 52a on the side of the magazine portion 30a. The reflecting means 140 may be a mirror carried at a 45° angle with respect to the light rays adapted to be emitted from light source 72 and with respect to the optical axis of the projector through the lens 73 and projection apertures 53 and 53a in the magazine 30. The reflecting means 140 is adapted to be selectively movable through the side opening 55a in the film magazine exposure chamber 30a between a position in the magazine for receiving and reflecting light rays from the light source 72 through the projection apertures 53 and 53a and lens 73, and a position removed from the magazine for allowing the magazine 30 to be assembled and disassembled from the projector.

The intermittent movement, film-engaging claw member 22 is adapted to move into and out of and down in slot 54 of 54a for engagement with the central row of sprocket holes 39 in the film 37 to provide the necessary intermittent movement of the film at the projection apertures 53 and 53a. The claw member 22 is flexible and forms part of a cage 145 (FIG. 8) surrounding a triangular cam member 146 rigidly secured to the shutter 26. The cage 145 and claw member 22 are held on the cam member 146 by a plate 147 connected to the cam member 146. The cage member 145 is pivotally mounted at its other end by a shaft 148 carried on the housing. As the triangular cam member 146 rotates with shutter 26, the cage 145 and claw member 22 are oscillated about shaft 148 and are provided with up and down intermittent movement for pulling the film 37 downwardly. Rearwardly protruding spaced cams 149 are provided on the rear of the shutter 26 for periodically engaging and forcing the claw member 22 into engagement with the film sprokcet holes 39. The claw member flexes back into its original position forwardly and out of engagement with film sprocket holes 39 when the cams 149 have rotated by the claw member 22.

The necessary control knobs, push buttons, amplifier switch, and sound control buttons are conveniently carried on the top of the base 21. Although not shown, it is preferred that a carrying case enclose the projector 20 and an assembled magazine 30 and that a speaker be provided within the carrying case.

In operation, it is easily seen that a magazine 30 threaded with a film 37 is positioned within the guideway 27 of the base 21 and shutter housing extension 25a. In so doing, disengaging bars 67 and 67a on the housing 25a enter grooves 66 and 66a on the forwardly extending magazine portion 30a and disengage the film sprocket hole-engaging pins 64 and 64a from the sprocket holes 39 of the film 37. The magazine is therefore properly positioned in the magazine guideway 27. The door 141 carrying the reflecting means 140 is pivoted inwardly to register the registration pins 143 and 143a with openings 52 and 52a in the magazine. The reflecting means 140 is therefore in proper reflecting position in the magazine. The shafts 74, 74a and 75 are moved transversely into engagement with film spools 33 and 33a, and drive sprocket 34, respectively. The projector is now fully threaded and ready for showing. After one row of film images has been shown the projector is automatically stopped. The magazine is removed, reversed through 180° and reassembled on the projector for the showing of the second row of film images.

Figure 8:
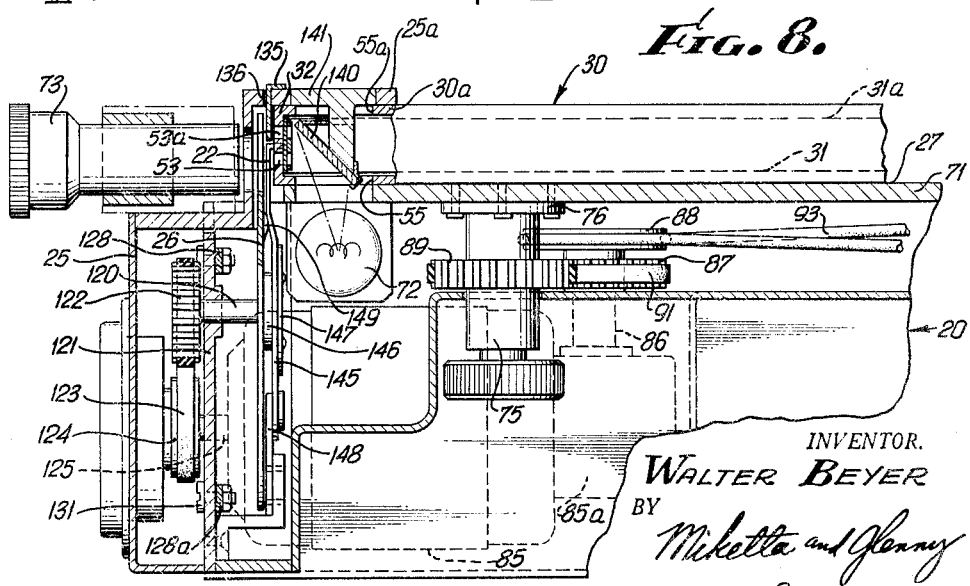
FIG. 8 is a transverse section of the device taken along plane VIII—VIII of FIG. 7.

If only a single row of images is to be shown, the blocking shield 135 is not removed from the position shown in FIG. 8. However, in the event both rows of images are to be shown, the shield 135 is removed allowing light to be reflected through both projection apertures 53 and 53a.

3-D embodiment

The present invention may also be used for 3-D projection by using a 3-D split lens 155 which superimposes the two images to simulate 3-D. This is shown as a modification of the present invention in FIG. 17 and a lens slide 156 may carry both the 3-D split lens 155 and a standard lens 157 for selected positioning of either in optical alignment with the projection apertures 53 and 53a of the magazine. It is preferred that the door 141 and mirror 140 of FIGS. 1 to 16 be removed and an additional light housing 158 be pivotally mounted on the housing extension 25a by means of the pin 142. The light housing 158 has its own light source 159 and a prism 160 adapted to extend through the side opening 55a and into the magazine 30.

When the prism 160 is in the magazine 30, one face of the prism 160 will reflect light rays from the light source 72 through projection apertures 53 and the other face of the prism 160 will reflect light rays from the light source 159 through projection aperture 53a. Thus each row of images 38 and 38a of film 37 is provided with a separate and uniform light source. It is understood that with 3-D projection, the images of both rows of images on film 37 are facing in the same direction and that the shield 135 is removed. The split lens 155 is known in the art and need not be specifically described. Such a lens and the cooperating parts of the present invention, allow two images to be substantially superimposed without keystoning as the images are of the same size and are moved together in a parallel manner.

It can therefore be seen that the projector of the present invention requires no film threading or rewinding. A single row of images or double row of images may be shown with synchronized sound reproduction without flutter or vibration. The film magazine of the present invention is symmetrical and may be reversed on the projector to show both rows of images, on a film carried thereby. There are means within the magazine for preventing the film from unreeling and maintaining perfect registration of the film with the projection apertures and claw member receiving slots when the magazine is removed from the projector. When the magazine is assembled on the projector, the film is in position for receiving the intermittent film pull-down member without danger of tearing or puncturing the film.

Moreover, the device of the present invention is very economical to produce and requires no unnecessary duplication of expensive parts, such as bearings.

Obviously many modifications and variations of the present invention are possible in the light of the above teachings. It is therefore to be understood that within the scope of the appended claims the invention may be practiced otherwise than as specifically described.

I claim:

1. The combination of a motion picture projector requiring no film threading and a removable and reversible film magazine enclosing and carrying a complete reel of film to be shown in said projector, comprising: a shutter housing on the projector including a lens carried on the front wall thereof and a magazine guideway rearwardly of and in alignment with said lens, a portable film magazine being removably carried in said guideway and having side members, a front wall member, and a forwardly extending film exposure chamber positioned in said shutter housing, said magazine enclosing and rotatably carrying a pair of spaced film spools and a film drive sprocket, said film spools adapted to carry a motion picture film having two rows of images being separated by a central row of sprocket holes, and a separate sound track for each row of images; said front wall of said film exposure chamber of said magazine including a pair of projection apertures for optically registering with said two rows of images on the film and being in optical alignment with said lens, and a centrally located slot above and below said projection apertures for receiving a film pull-down claw member adapted to engage the central row of sprocket holes in the film, opposed openings in the side members of said film exposure chamber of said magazine spaced rearwardly of said front wall for receiving reflecting means and light source means carried by the projector, said shutter housing on said projector having a light source means on one side of said magazine guideway adapted to project light rays through one side opening in said magazine film exposure chamber and reflecting means pivotally mounted on the opposite side of said magazine guideway and selectively movable through said other side opening in the film magazine exposure chamber between a position within said magazine chamber for receiving and reflecting light rays from said light source through said projection apertures and lens, and a position removed from said magazine chamber for allowing said magazine to be assembled and disassembled from said projector.

2. The combination as stated in claim 1, wherein said shutter housing of said projector includes a shutter means between said projection apertures on the front wall of the magazine and said lens, and a film pull-down claw member for engaging the central row of sprocket holes in the film through the centrally located slots in the front wall of said magazine.

3. The combination of a motion picture projector requiring no film threading and a removable film magazine enclosing and carrying a reel of film to be shown in said projector, comprising: a shutter housing on the projector, including a lens carried on the front wall thereof and a vertical magazine guideway rearwardly of and in alignment with said lens; a portable film magazine being removably carried in said vertical guideway and having side members, a front wall member, and a forwardly extending film exposure chamber positioned in said shutter housing, said magazine adapted to be assembled and disassembled from said projector by movement along the plane of said guideway; said magazine enclosing and carrying a motion picture film having a row of holes therein and adapted to be moved within and through said film exposure chamber of said magazine; said front wall of said film exposure chamber of said magazine including a projection aperture for optically registering with the images on said film and being in optical alignment with said lens, and a slot adjacent said projection aperture for receiving a film pull-down claw member adapted to engage the row of holes in the film in said magazine, said magazine having opening means therein spaced rearwardly from said front wall and in alignment with said projection aperture for receiving light reflecting means carried by said projector; said shutter housing on said projector including a light source means on one side of said magazine guideway and light reflecting means pivotally mounted on one side of said magazine guideway and selectively movable into and out of said opening means on said magazine between a position for receiving and reflecting light rays from said light source through said projection aperture and lens, and a position removed from said opening means on said magazine for allowing said magazine to be assembled and diassembled from said guideway on said projector; a shutter means between said projection aperture of the front wall of said magazine and said lens, and an intermittent movement film pull-down claw member for engaging the row of holes in the enclosed film through said slot in the front wall of said magazine.

4. The combination of a projector and magazine as stated in claim 3, including complementary means in said shutter housing and on said forwardly extending film exposure chamber of said magazine for properly registering and aligning said projection aperture with said lens when said magazine is assembled in said guideway.

5. The combination of a motion picture projector requiring no film threading and a removable film magazine enclosing and carrying a reel of film to be shown in said projector, comprising:

a housing on the projector including a lens carried on the front wall thereof and a magazine guideway rearwardly of and in alignment with said lens;

a portable magazine being removably carried in said guideway and adapted to be assembled and diassembled from said projector by movement along the plane of said guideway;

said magazine having a projection aperture and opening means therein for receiving light reflecting means carried by said projector;

said housing on said projector including a light source means on one side of said magazine guideway and light reflecting means pivotally mounted on one side of said magazine guideway and selectively movable into and out of said opening means on said magazine between a position for receiving and reflecting light rays from said light source through said projection aperture and lens, and a position removed from said opening means on said magazine for allowing said magazine to be assembled and disassembled from said guideway on said projector.

References Cited by the Examiner

UNITED STATES PATENTS

| | | | |
|---|---|---|---|
| 917,697 | 4/09 | Woodworth | 352—227 |
| 1,087,996 | 2/14 | Tessier | 352—76 |
| 1,824,709 | 9/31 | Debrie | 352—77 |
| 1,928,434 | 9/33 | Pomeroy et al. | 352—176 |
| 2,051,786 | 8/36 | Foster | 352—158 |
| 2,196,736 | 4/40 | Merriman | 352—30 |
| 2,464,965 | 3/49 | Chemel | 242—55.19 |
| 2,466,524 | 4/49 | Williams | 352—78 |
| 2,624,232 | 1/53 | Kingston | 352—83 |
| 2,625,073 | 1/53 | Young et al. | 352—123 |
| 2,694,955 | 11/54 | Foster | 242—71.2 |
| 2,807,188 | 9/57 | Badgley | 352—77 |

FOREIGN PATENTS

| | | |
|---|---|---|
| 643,395 | 4/37 | Walter. |

JULIA E. COINER, *Primary Examiner.*

EMIL G. ANDERSON, WILLIAM MISIEK, G. Y. CUSTER, NORTON ANSHER, *Examiners.*